US006499342B1

(12) United States Patent
Gonzales, Jr.

(10) Patent No.: US 6,499,342 B1
(45) Date of Patent: Dec. 31, 2002

(54) METHOD OF DETERMINING THE STOPPING POSITION OF AN INTERNAL COMBUSTION ENGINE

(75) Inventor: Frank Gonzales, Jr., Garden City, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 46 days.

(21) Appl. No.: 09/655,158

(22) Filed: Sep. 5, 2000

(51) Int. Cl.[7] .............................................. G01M 15/00
(52) U.S. Cl. ....................................................... 73/117.3
(58) Field of Search .............................. 73/117.3, 116, 73/117.2

(56) References Cited

U.S. PATENT DOCUMENTS

| | | | | |
|---|---|---|---|---|
| 5,311,430 A | * | 5/1994 | Ishigami | 364/424.04 |
| 5,353,635 A | * | 10/1994 | Saiki et al. | 73/117.2 |
| 5,548,995 A | * | 8/1996 | Clinton et al. | 73/117.3 |
| 5,604,304 A | | 2/1997 | Kokubo et al. | |

* cited by examiner

Primary Examiner—Eric S. McCall
Assistant Examiner—Maurice Stevens

(57) ABSTRACT

A method of determining the stopping position of an internal combustion engine infers the angular position of the engine's crankshaft by analyzing the periodic waveform of an output signal produced by a crankshaft position sensor. When the engine is turned off and begins to slow to a stop, an inference routine is commenced in which the ratio of the amplitude of the signal to the time of successive half periods of the waveform is calculated. The amplitude-to-time ratio is used in secondary ratio calculations to obtain ratio values that are then compared to a preselected constant. The result of the ratio value-to-constant comparison reveals whether the crankshaft is continuing to turn in the same direction, or has stopped and reversed its direction. A "bookkeeping" record of the current crankshaft angle is incremented or decremented by a predetermined value each time the ratios are calculated until the engine had stopped. Without the present invention method, the changes in engine rotational direction cannot be detected and simply monitoring the raw signal would give unreliable stopping position information because of the missed reversal(s).

13 Claims, 4 Drawing Sheets

| Volts | Time | Amplitude | Delta Time | Amplitude Div By Time | Curr Amp/Time Divide By Prev | Curr Ratio Div By Prev | Engine Position Bookkeeping | |
|---|---|---|---|---|---|---|---|---|
| 4.6875 | 9562 | | | | | | | |
| 0.7 | 9695 | 3.9875 | 0.00665 | 599.62 | | | 450 | |
| 3.875 | 9840 | 3.175 | 0.00725 | 437.93 | 0.73 | | 455 | |
| 1.875 | 10070 | 2 | 0.0115 | 173.91 | 0.40 | 0.54 | 460 | |
| 3.025 | 10575 | 1.15 | 0.02525 | 45.54 | 0.26 | 0.66 | 465 | Stop & Reverse |
| 1.25 | 10850 | 1.775 | 0.01375 | 129.09 | 2.83 | 10.82 | 460 | |
| 4.05 | 11020 | 2.8 | 0.0085 | 329.41 | 2.55 | 0.90 | 455 | |
| 0.625 | 11175 | 3.425 | 0.00775 | 441.94 | 1.34 | 0.53 | 450 | |
| 4.475 | 11295 | 3.85 | 0.006 | 641.67 | 1.45 | 1.08 | 445 | |
| 0.375 | 11430 | 4.1 | 0.00675 | 607.41 | 0.95 | 0.65 | 440 | |
| 4.625 | 11540 | 4.25 | 0.0055 | 772.73 | 1.27 | 1.34 | 435 | |
| 0.25 | 11670 | 4.375 | 0.0065 | 673.08 | 0.87 | 0.68 | 430 | |
| 4.7 | 11770 | 4.45 | 0.005 | 890.00 | 1.32 | 1.52 | 425 | |
| 0.25 | 11895 | 4.45 | 0.00625 | 712.00 | 0.80 | 0.61 | 420 | |
| 4.6 | 12010 | 4.35 | 0.00575 | 756.52 | 1.06 | 1.33 | 415 | |
| 0.5 | 12145 | 4.1 | 0.00675 | 607.41 | 0.80 | 0.76 | 410 | |
| 4.25 | 12275 | 3.75 | 0.0065 | 576.92 | 0.95 | 1.18 | 405 | |
| 1 | 12450 | 3.25 | 0.00875 | 371.43 | 0.64 | 0.68 | 400 | |
| 3.45 | 12645 | 2.45 | 0.00975 | 251.28 | 0.68 | 1.05 | 395 | |
| 2.475 | 12950 | 0.975 | 0.01525 | 63.93 | 0.25 | 0.38 | 390 | |
| 2.525 | 13080 | 0.05 | 0.0065 | 7.69 | 0.12 | 0.47 | 385 | Stop & Reverse |
| 1.75 | 13510 | 0.775 | 0.0215 | 36.05 | 4.69 | 38.95 | 390 | |
| 3.6 | 13760 | 1.85 | 0.0125 | 148.00 | 4.11 | 0.88 | 395 | |
| 1.25 | 14000 | 2.35 | 0.012 | 195.83 | 1.32 | 0.32 | 400 | |
| 3.8 | 14190 | 2.55 | 0.0095 | 268.42 | 1.37 | 1.04 | 405 | |
| 1.2 | 14405 | 2.6 | 0.01075 | 241.86 | 0.90 | 0.66 | 410 | |
| 3.75 | 14595 | 2.55 | 0.0095 | 268.42 | 1.11 | 1.23 | 415 | |
| 1.375 | 14825 | 2.375 | 0.0115 | 206.52 | 0.77 | 0.69 | 420 | |
| 3.35 | 15060 | 1.975 | 0.01175 | 168.09 | 0.81 | 1.06 | 425 | |
| 2.25 | 15405 | 1.1 | 0.01725 | 63.77 | 0.38 | 0.47 | 430 | |
| 2.6 | 16000 | 0.35 | 0.02975 | 11.76 | 0.18 | 0.49 | 435 | Stop & Reverse |
| 2.05 | 16620 | 0.55 | 0.031 | 17.74 | 1.51 | 8.17 | 430 | |
| 2.9 | 17225 | 0.85 | 0.03025 | 28.10 | 1.58 | 1.05 | 425 | |
| 2.45 | 17800 | 0.45 | 0.02875 | 15.65 | 0.56 | 0.35 | 420 | |
| | | | | ADHT | ADHTR | ADHTRnew | | |
| | | | | | | Divided By | | |
| | | | | | | ADHTRold | | |

FIG. 5

| 48 | 49 | 50 | 51 | 52 | 53 | 54 | 55 | 56 |
|---|---|---|---|---|---|---|---|---|
| Volts | Time | Amplitude | Delta Time | Amplitude | Curr Amp/Time | Curr Ratio | Engine Position | |
| 0.625 | 7115 | | | Div By Time | Divide By Prev | Div By Prev | Bookkeeping | |
| 4 | 7260 | 3.375 | 0.0075 | 465.52 | | | 225 | |
| 1.4 | 7470 | 2.6 | 0.0105 | 247.62 | 0.53 | | 230 | |
| 3.4 | 7725 | 2 | 0.01275 | 156.86 | 0.63 | 1.19 | 235 | |
| 1.65 | 8055 | 1.75 | 0.0165 | 106.06 | 0.68 | 1.07 | 240 | |
| 3.4 | 8340 | 1.75 | 0.01425 | 122.81 | 1.16 | 1.71 | 245 | |
| 1.3 | 8615 | 2.1 | 0.01375 | 152.73 | 1.24 | 1.07 | 250 | |
| 4 | 8790 | 2.7 | 0.00875 | 308.57 | 2.02 | 1.62 | 255 | |
| 0.7 | 8950 | 3.3 | 0.008 | 412.50 | 1.34 | 0.66 | 260 | |
| 4.5 | 9075 | 3.8 | 0.00625 | 608.00 | 1.47 | 1.10 | 265 | |
| 0.375 | 9205 | 4.125 | 0.0065 | 634.62 | 1.04 | 0.71 | 270 | |
| 4.65 | 9310 | 4.275 | 0.00525 | 814.29 | 1.28 | 1.23 | 275 | |
| 0.275 | 9435 | 4.375 | 0.00625 | 700.00 | 0.86 | 0.67 | 280 | |
| 4.7 | 9540 | 4.425 | 0.00525 | 842.86 | 1.20 | 1.40 | 285 | |
| 0 | 9685 | 4.7 | 0.00725 | 648.28 | 0.77 | 0.64 | 290 | |
| 4.75 | 10010 | 4.75 | 0.01625 | * 496.92 | 0.77 | 1.00 | 300 | Missing Tooth |
| 0.95 | 10195 | 3.8 | 0.00925 | 410.81 | 0.83 | 1.08 | 310 | |
| 3.55 | 10375 | 2.6 | 0.009 | 288.89 | 0.70 | 0.85 | 315 | |
| 2.4 | 10640 | 1.15 | 0.01325 | 86.79 | 0.30 | 0.43 | 320 | |
| 2.6 | 10880 | 0.2 | 0.012 | 16.67 | 0.19 | 0.64 | 325 | Stop & Reverse |
| 1.65 | 11250 | 0.95 | 0.0185 | 51.35 | 3.08 | 16.04 | 320 | |
| 3.65 | 11480 | 2 | 0.0115 | 173.91 | 3.39 | 1.10 | 315 | |
| 0.9 | 11730 | 2.75 | 0.0125 | 220.00 | 1.27 | 0.37 | 310 | |
| 4 | 12240 | 3.1 | 0.0255 | * 206.67 | 0.94 | 0.74 | 300 | Missing Tooth |
| 1.4 | 12510 | 2.6 | 0.0135 | 192.59 | 0.93 | 0.99 | 290 | |
| 3.25 | 12750 | 1.85 | 0.012 | 154.17 | 0.80 | 0.86 | 285 | |
| 2.475 | 13100 | 0.775 | 0.0175 | 44.29 | 0.29 | 0.36 | 280 | |
| 2.525 | 13330 | 0.05 | 0.0115 | 4.35 | 0.10 | 0.34 | 275 | Stop & Reverse |
| 2.05 | 14040 | 0.475 | 0.0355 | 13.38 | 3.08 | 31.35 | 280 | |
| 2.95 | 14575 | 0.9 | 0.02675 | 33.64 | 2.51 | 0.82 | 285 | |
| 2.2 | 15185 | 0.75 | 0.0305 | 24.59 | 0.73 | 0.29 | 290 | |
| | | | | ADHT | ADHTR | ADHTRnew | | |
| | | | | | | Divided By | | |
| | | | | | | ADHTRold | | |

FIG. 6

METHOD OF DETERMINING THE STOPPING POSITION OF AN INTERNAL COMBUSTION ENGINE

FIELD OF THE INVENTION

This invention generally relates to methods for determining the position of moveable internal components such as a crankshaft, in an internal combustion engine, and deals more particularly with a method for determining the stopping position of the crankshaft relative to the timing cycle of the engine's cylinders (hereafter referred to as "engine stopping position").

BACKGROUND OF THE INVENTION

In order to control ignition timing, fuel injection and other functions in an internal combustion engine, it is necessary to determine the angular displacement of the engine's crankshaft with each stroke. In many cases, it is also necessary to determine the angular position of the engine's camshaft, particularly where variable cam timing systems are employed to vary the timing between a camshaft and the crankshaft. In order to achieve smooth engine startup without misfires following engine shutdown, it is necessary to know the final angular position of the crankshaft relative to the engine's firing sequence and cylinder cycle timing. When the ignition is shut off and the engine comes to a stop, the measured final crankshaft position and final cycle state (e.g. compression stroke) of the engine's cylinders is stored in the memory of a power train control module or similar controller, which then uses this information during engine startup to synchronize the fuel injection with the engine cylinder cycle timing.

In order to accurately synchronize the fuel injection for the needed start, it is necessary to determine the rotational position of the engine. Camshaft position information is needed in order to know which part of the four stroke cycle the engine is on. Sensors typically used to sense camshaft angle position such as variable reluctance sensors do not provide accurate information at low engine speed, e.g. speed below 250 crank RPM's. Consequently, ambiguity may exist in the information that is recorded to indicate the final stopping position of the engine. Attempts have been made to resolve such ambiguities through estimates based on sensor data but these techniques do not assure that the recorded engine stopping position data is accurate.

Accordingly, there exists a need for a method of determining the stopping position of an engine which can detect the engine's final stopping position consistently and accurately. There also exists a need to associate the data indicating the final stopping position of the engine with information indicating which part of a four stroke cycle the engine is on, using conventional sensors for determining the rotational positions of the camshaft and crankshaft.

SUMMARY OF THE INVENTION

It is an object of the present invention to provide a method for accurately determining the final stopping position of an internal combustion engine by interpreting information contained in a periodically varying crankshaft position signal whose amplitude and frequency vary as a function of the speed and rotational position of the crankshaft.

In accordance with the primary object of the invention, in a preferred embodiment, the method comprises generating a periodic crankshaft position signal having an amplitude and frequency that vary as a function of the speed and rotational position of said crankshaft; for each half period of said signal, obtaining the ratio of the amplitude of said signal to the time interval of the corresponding half period; generating a set of secondary ratios to obtain a set of ratio values; successively comparing the calculated ratio values with a preselected constant value, the results of the comparisons indicating slow down and continued rotation in the same direction or stoppage and reversal of the rotational direction of said crankshaft; and, updating a record indicating the current rotational position of said crankshaft based on the results of the comparison.

An advantage of the present method is that by using position information generated by conventional sensors and performing calculations involving the position data, a record can be generated of the engine position which can distinguish between the engine slowing down and continuing on in the same direction or slowing down and reversing rotational direction. An added advantage of the invention is that the method may be employed with crankshaft position sensors that rely on a missing tooth on a crankshaft sprocket commonly employed as a reference mark for determining angular crankshaft position.

These and other features and advantages of the present invention may be better understood by considering the following details of a description of a preferred embodiment of the invention. In the course of this description, reference will frequently be made to the attached drawings.

BRIEF DESCRIPTION OF THE DRAWINGS

FIG. 5 is a table depicting measured and calculated data in accordance with the present method when the engine is almost stopped and the missing tooth is not in the proximity of the crank position sensor;

FIG. 6 is a table similar to that shown in FIG. 5, but depicting measured and calculated data when the engine is almost stopped and the missing tooth is in the proximity of the crank position sensor.

DETAILED DESCRIPTION OF THE PREFERRED EMBODIMENT

Figure 1:
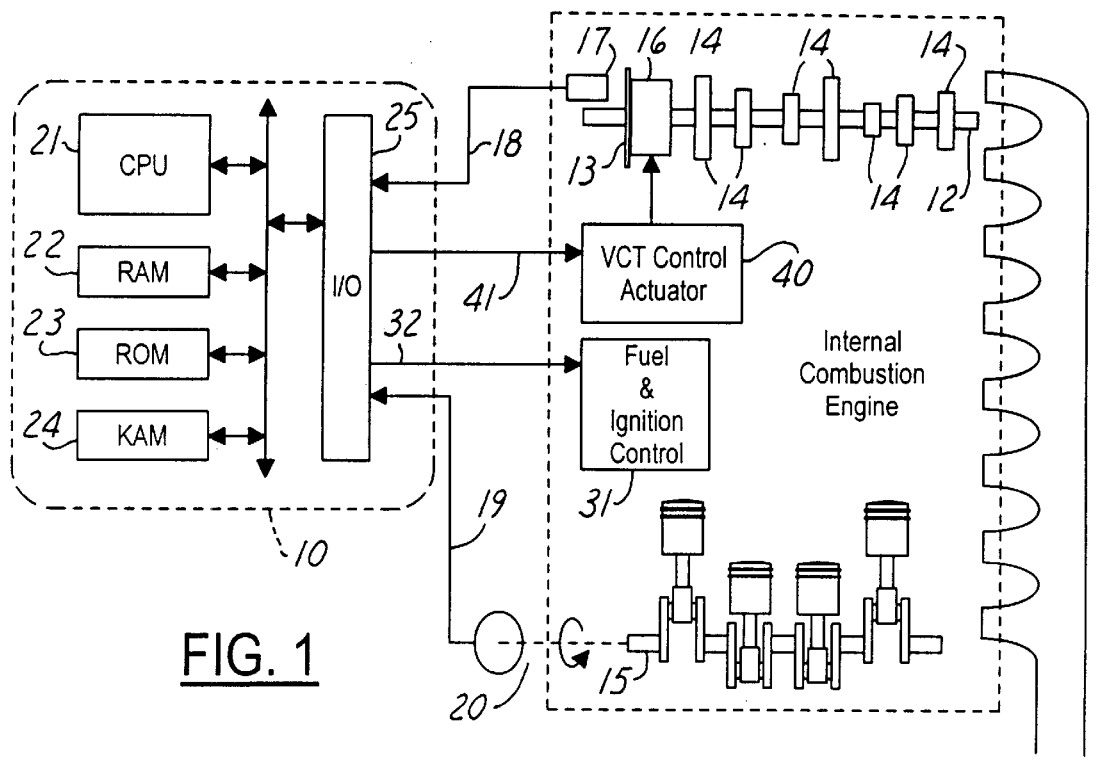
FIG. 1 shows a portion of an internal combustion engine and power train controller which may be employed for practicing the method forming the preferred embodiment of the invention.

In FIG. 1 of the drawings, an internal combustion engine comprises a rotatable camshaft 12 having a plurality of cams 14 which rotate in timed relationship to the rotation of a crankshaft 15. This timing relationship may or may not be variable. Although FIG. 1 shows a single camshaft, it is to be understood that engines utilizing either an in-line cylinder configuration or a V-type cylinder configuration may employ multiple camshafts. A pulse wheel 13 positioned on a drive gear 16 of the camshaft 12 comprises teeth positioned in fixed relationship to the cams 14 on the camshaft 12. A sensor 17, which may be of the variable reluctance type, detects the angular position of the teeth on the pulse wheel 13 as the camshaft rotates and generates a representative cam timing/cylinder identification signal (VCT/CID) 18; in the illustrated embodiment, this signal is variable. A variable cam timing (VCT) signal control actuator 40 receives control signal 41 from a power train control module (PCM) and generates a camshaft control signal 42 that is used to control the angular position of the cams 14 relative to crankshaft 50. A conventional variable reluctance sensor 20 is used to sense the movement of teeth formed on a crankshaft sprocket (FIG. 3.) that rotates with the crankshaft 15 generating the CKP signal.

The PCM 10 comprises a central processing unit 21, a read-only memory (ROM) 23 for storing control programs, a random access memory (RAM) 22 for temporary data storage, a keep-alive memory (KAM) 24 for storing learned values and a conventional data bus. The PCM 10 receives the VCT/CID signal 18, the CKP signal 20, and generates signals to control the timing of fuel injected by injectors within the engine and control the spark plug firing of the air-fuel mixture within the combustion chambers of the engine. The PCM 10 also controls the relationship of the two input signals 18 and 20 through output signals 41 from the PCM, to the VCT control actuator 40. Although the system in FIG. 1 employs a camshaft having timing that is variable relative to the crankshaft 15, it is to be understood that the method of the present invention may be advantageously employed in a system wherein the timing of the camshaft relative to the crankshaft is fixed.

Figure 3:
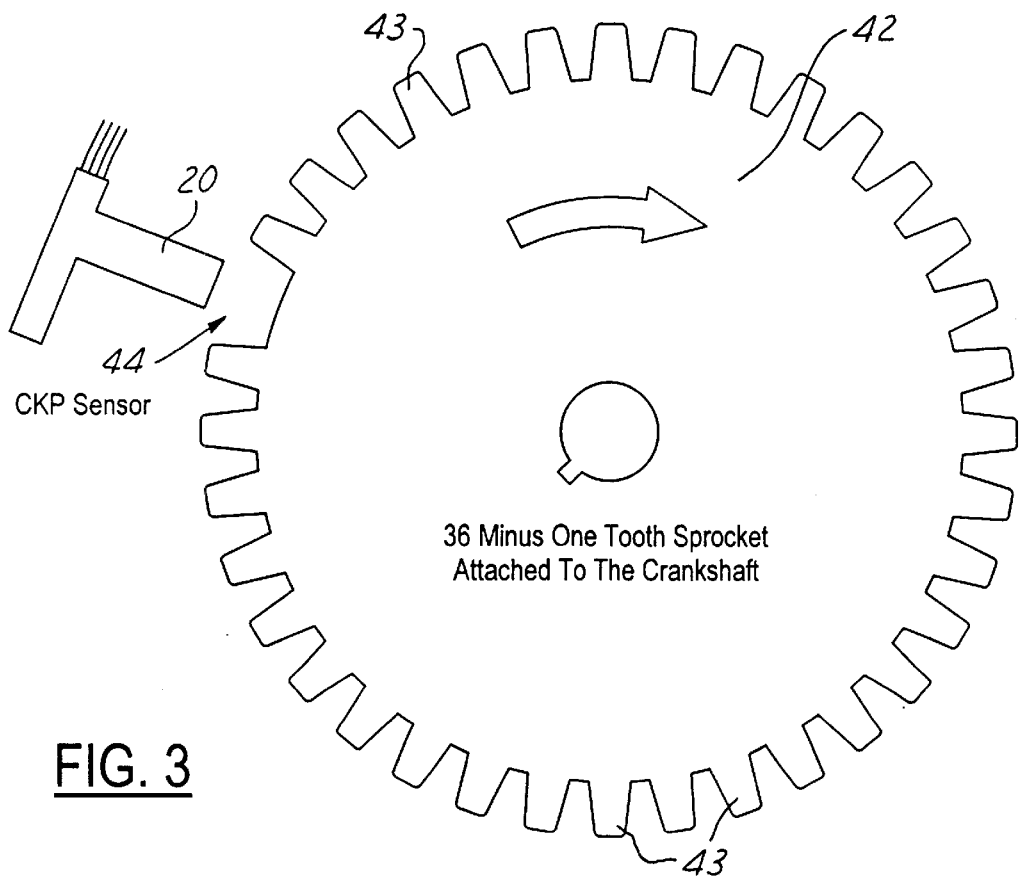
FIG. 3 is a diagrammatic view of a crankshaft sprocket having a missing tooth, shown in operative relationship to a crankshaft position sensor.
Figure 2:
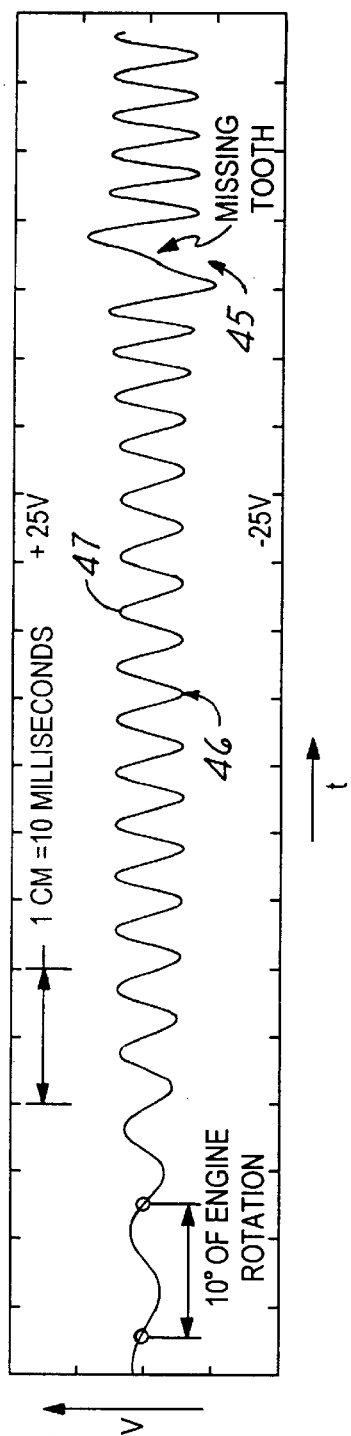
FIG. 2 is a waveform diagram showing an electrical signal output by a crankshaft position sensor employed to sense the angular position of a crankshaft sprocket having a missing tooth.

Referring now to FIGS. 2 and 3, as previously indicated, the sensor 20 may be of the variable reluctance type, and functions to sense the passage of each of a plurality of teeth 43 formed on a sprocket 42 that is keyed to and rotates with crankshaft 15. The sprocket 42 possesses thirty-five equally spaced teeth 43 and a "missing tooth" shown at 44. The missing tooth 44 is detected by the sensor 20 to produce a signal that forms a reference point or mark for purposes of determining engine timing.

Sensor 20 produces a periodically varying electrical output voltage signal that is shown in FIG. 2, having a set of waveform characteristics that are advantageously used in accordance with the present invention. At rotational speeds above a certain value e.g. 40 RPM, the sensor output signal possesses an amplitude and frequency that are functions of the rotational speed and position of the sprocket 42, and thus of the crankshaft 15. The relative minimum value of the signal shown at 46 is developed when the sensor 20 detects the passage thereby of the valley or space between the as adjacent teeth 43, while the relative maximum or peak value of the signal, shown at 47 represents the detection by the sensor 20 of the passage of a tooth 43. The detection by sensor 20 of the missing tooth 44 produces a slightly accentuated signal for a single cycle, indicated by the numeral 45 in FIG. 2.

As previously discussed, when engine speed drops below a relatively low level, such as 250 RPM, the variable reluctance sensor 17 is no longer capable of providing accurate camshaft location information. The PCM 10 is then forced to keep track of which part of the 4 stroke cycle the engine is on purely through inference. In many cases the variable reluctance sensor 20 employed to pick up the rotational position of a crankshaft 15 is more accurate at low engine RPM levels compared to the camshaft sensor 17. At low engine speeds, the sensor 20 is not highly effective in detecting the missing tooth 44 and thus the missing tooth 44 results in a signal that, although only slightly accentuated, appears very much like that produced by a normal tooth, as can be seen in FIG. 2. Consequently, the PCM keeps track of the missing tooth 44 at low engine speeds, also by an inference technique that employs counting of the teeth 43. In order to determine the crankshaft angle at low engine RPM through the inference technique, the calculations performed to determine crankshaft angle based on the detection of the other, normal teeth must be mathematically modified to compensate for the missing tooth 44. Likewise, a "bookkeeping" record used to keep track of how many degrees the crankshaft 15 has rotated through must also be modified to take the missing tooth 44 into consideration.

When the ignition is switched off for engine shut down and the engine RPMs drop below a certain value, then the PCM 10 is required to switch from its normal routine for keeping track of crankshaft angle to a stopping position routine in order to get the background loop down to an acceptable limit, e.g. 0.5 milliseconds. At this point, the PCM 10 begins keeping track of which part of the 4 stroke cycle the engine is on, in anticipation of the camshaft position sensor 17 failing to give accurate information due to low engine RPMs.

In accordance with the method of the present invention, a value "ADHT" is obtained by dividing the peak-to-valley amplitude of the electrical signal output by sensor 20, by the time interval between a peak and adjacent valley. This calculation is successively performed for every half wave of the periodically varying output signal from sensor 20. Then, the most current or "new" $ADHT_{new}$ is divided by the previous $ADHT_{old}$ to yield a value "ADHTR" (amplitude divided by time ratio). Subsequently, the most current or "new" $ADHTR_{new}$ is divided by the previous $ADHTR_{old}$, and if the resultant value is less than a preselected, calibratable constant, then it is known that the engine is continuing to rotate in the same direction. If, however, the value of $ADHTR_{new}/ADHTR_{old}$ is greater than the constant value, then it is known that the engine has slowed to a stop condition and then reversed its rotational direction. From the foregoing, it may thus be appreciated that by generating a series of ratios derived from measured characteristics of the signal produced by the crankshaft angle position sensor, and then comparing the resultant ratio values to a reference constant, a determination can be made of whether the engine has slowed down and continued in the same direction or has stopped and reversed its direction of rotation. As will become apparent from the description below, in the absence of this determination, it would not otherwise be possible to accurately track the crankshaft angle during the last stage of engine shut down since a reversal of the crankshaft direction would result in the incremental recording of crankshaft movement in the wrong direction.

The PCM 10 maintains a continuous record of the rotational position of the crankshaft 15, which may be referred to as engine position "bookkeeping". The engine position bookkeeping performed by the PCM is initialized with the engine turning in its normal rotational direction, and the engine crankshaft position stored in the PCM 10 is increased by a predetermined amount, e.g. 5 crank degrees for every calculation of the ADHT. When the most current $ADHTR_{new}$ divided by the previous $ADHTR_{old}$ exceeds the preselected constant, then 5 degrees is subtracted for every ADHT calculation; this routine is continued until the $ADHTR_{new}/ADHTR_{old}$ exceeds the constant again or until the engine comes to a stop. In other words, when the calculated ratio of $ADHTR_{new}/ADHTR_{old}$ exceeds the constant, it is known that the direction of rotation has changed, and the bookkeeping of the crank angle is likewise changed to the opposite rotational direction, either by incrementing or decrementing the most recent stored value of the engine position, until the engine has stopped.

Special bookkeeping is required for the missing tooth; in the illustrated embodiment, 10 degrees is either added or subtracted for the missing tooth and the normal tooth that follows it, rather than the 5 degrees employed for the other teeth.

Figure 4:
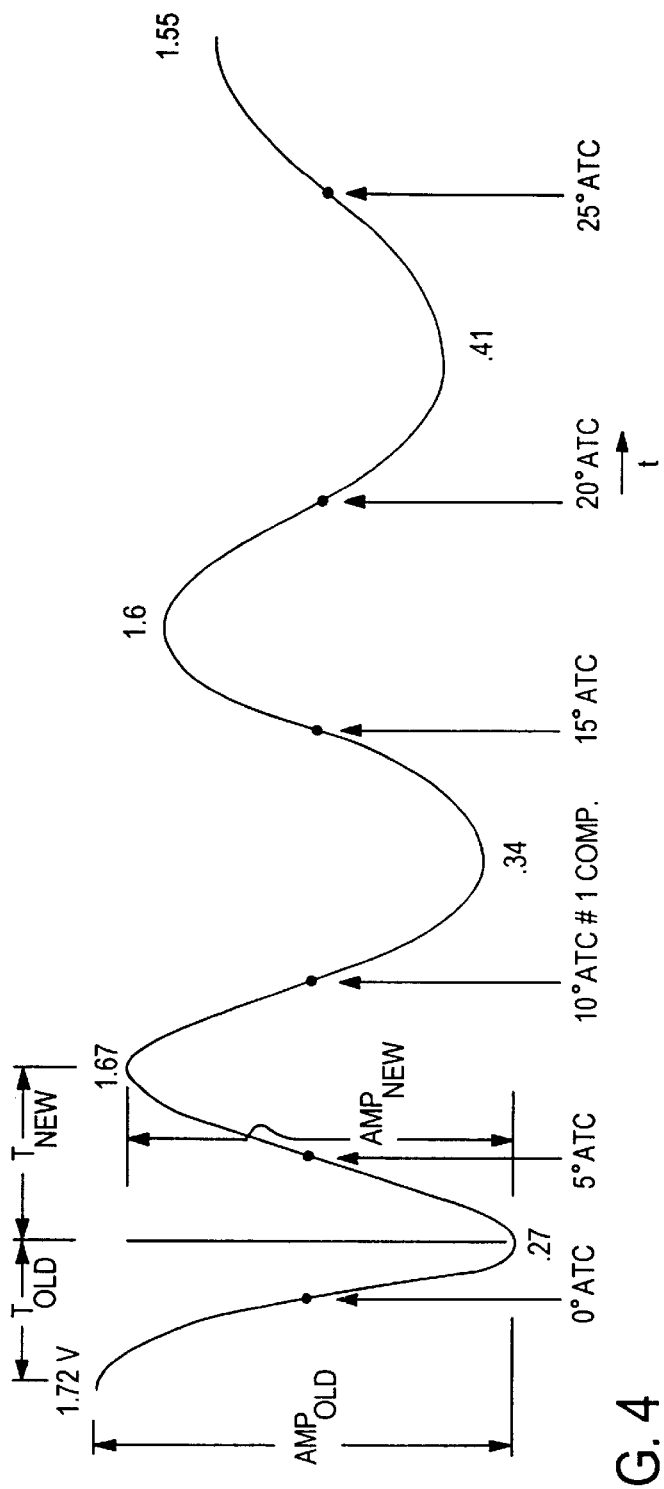
FIG. 4 is a waveform diagram showing the crankshaft position signal after ignition shut off.

The method and technique described above is better understood by reference now to FIG. 4. In FIG. 4, $T_{old}$ and $T_{new}$ respectively designate successive half wave periods over which the amplitude of output signal is measured from valley-to-peak. This measured amplitude is divided by the varying half wave time period "T" to produce the value ADHT. The points on the waveform corresponding to the 5 degree intervals between bookkeeping entries (and ratio calculations) are designated as 0 ATC, 5 ATC, 10 ATC etc. These designations refer to the crankshaft position "after top center" referenced to the cycle state of a particular cylinder (in the example illustrated in FIG. 4, the compression stroke of cylinder no. 1).

FIG. 5 is an exemplary table of actual data and ratio values that have been measured and calculated in accordance with the method of the present invention. In FIG. 5, columns 48 and 49 show measured data representing the voltage output from the sensor 20 as a function of time, taken at various engine position bookkeeping values that are shown in column 55. Column 50 shows the peak-to-valley amplitude and Column 51 shows the time interval "T" over which the amplitude is measured. Column 52 shows values representing the calculation of ADHT ratio, which corresponds to the division of the amplitude values in column 50 by the time values in Column 51. Column 53 shows the calculated values of ADHTR, and Column 54 shows values of the calculated ratio of $ADHTR_{new}$ divided by the $ADHTR_{old}$. In the case of the data shown in FIGS. 5 and 6, each of the values in column 54 are compared with a pre-selected constant value which, in the illustrated embodiment is a constant value of the integer 3. When the calculated value in column 4 is less than the constant integer 3, it is inferred that the engine is continuing to rotate in the same direction. When, the calculated value shown in Column 54 increases to a value greater than the integer 3, then it is inferred that the engine has stopped and its direction of rotation and has reversed. The calculations are continued in this manner until the engine stops. The final stopped position of the engine will be reflected in the engine position shown in column 55. The stopping position is stored in KAM for use in timing the fuel delivery for the next start.

The data in table shown in FIG. 6 is similar to that shown in FIG. 5 except that the table of FIG. 6 takes into consideration the missing tooth 44. In order to compensate for the signal error created by the missing tooth 44, the ADHT data shown in Column 52 corresponding to the missing tooth (i.e., the values of 496.92 and 206.67) are multiplied by a factor of 1.7.

It is to be understood that the specific methods and techniques which have been described are merely illustrative of one application of the principle of the invention. Numerous modifications may be made to the method as described without departing from the true spirit and scope of the invention.

What is claimed is:

1. In an internal combustion engine, a method of determining the final stopping position of said engine where said engine may have reversed its direction of rotation following shut off of the engine's ignition system during engine shut down, comprising the steps of:

(A) generating a periodic crankshaft position signal having an amplitude and a frequency that vary as a function of the speed and rotational position of said crankshaft;

(B) measuring the amplitude "AMP" of said signal over an interval of time "T" between each half wave of said position signal after said ignition system has been shut off;

(C) generating a set of ratio values by dividing the amplitudes AMP measured in step (B) by the values of the corresponding time intervals T;

(D) comparing successive ratio values generated in step (C) with a preselected constant value related to said stopping position of said engine, a change in the relationship of successive ones of said ratio values to said constant value indicating whether said engine has slowed down and continued in the same rotational direction or has stopped and reversed its rotational direction;

(E) updating a record of the current rotational position of said crankshaft each time steps (C) and (D) are performed.

2. The method as set forth in claim 1, wherein step (E) includes:

incrementing the record of said rotational position by a preselected value when said crankshaft is rotating in one rotational direction thereof, and decrementing the record of said rotational direction by said preselected value when said crankshaft is rotating in the opposite rotational direction thereof.

3. The method as set forth in claim 2, wherein step (C) is further performed by:

determining the ratio "ADHT" according to the formula $$ADHT = AMP_{new}/T_{new}$$

where:

$AMP_{new}$ is the most recently determined peak amplitude, and $T_{new}$ is the time interval over which $AMP_{new}$ is determined, obtaining the value "ADHTR" according to the formula $$ADHTR = ADHT_{new}/ADHT_{old}$$

where:

$ADHT_{new}$ is the value of ADHT obtained during the most recent time interval $T_{new}$, $ADHT_{old}$ is the value of ADHT obtained during a time interval $T_{old}$, and $T_{old}$ is the time interval immediately preceding time interval $T_{new}$ obtaining the value of the ratio "$ADHTR_{new}/ADHTR_{old}$", where $ADHTR_{new}$ is the value of ADHTR obtained during the most recent time interval $T_{new}$ and $ADHTR_{old}$ is the value of ADHTR obtained during the previous time interval $T_{old}$.

4. In an internal combustion engine having a rotatable crankshaft, a method of determining the final stopping position of said engine after the ignition system of said engine has been shut off and said engine may have reversed its direction of rotation before reaching its final stopping position, comprising the steps of:

(A) generating a periodic crankshaft position signal having an amplitude and frequency that vary as a function of the speed and rotational position of said crankshaft;

(B) for each half period of said signal, obtaining the ratio of the amplitude of said signal to the time interval of the corresponding half period;

(C) generating a set of secondary ratios using the ratios obtained in step (B), to provide a set of secondary ratio values;

(D) successively comparing the ratio values generated in step (C) with a preselected constant value related to said stopping position of said engine, a change in the relationship of successive ones of said ratio values to said constant value indicating whether said engine has slowed down and continued rotation in the same direction or has stopped and reversed its rotational direction; and, (E) updating a record indicating the current rotational position of said crankshaft based on the results of the comparison performed in step (D).

5. The method as set forth in claim 4, wherein step(C) is performed by:

generating a first group of ratio values, and generating a second group of ratio values using said first group of ratio values.

6. The method as set forth in claim 5, wherein each of the ratio values in said first group thereof is obtained by dividing the ratio of the amplitude of said signal to the time interval of the most current half period by the ratio of the amplitude of said signal to the time interval of the preceding half period.

7. The method as set forth in claim 5, wherein each of the ratio values in said second group thereof is obtained by dividing a ratio in said first group thereof related to the most current half period by the ratio in said first group thereof related to the preceding half period.

8. The method as set forth in claim 4, including the steps of:

(F) storing a value representing the rotational position of said crankshaft; and, (G) changing the value stored in step (F) by a preselected amount each time step (D) is performed, whereby to establish a record of the current position of said crankshaft when said engine reaches a final stopping position.

9. The method as set forth in claim 4, wherein:

step (A) is performed by sensing the passage of each of a plurality of teeth on a rotating sprocket, wherein at least one of said teeth is missing on said sprocket, the sensing of the passage of said missing tooth introducing an error into certain of the ratios obtained in step (B), and said method further includes the step of compensating for said error by modifying the ratio obtained in step (B) for the half periods in which said error is introduced into said certain ratios.

10. In an internal combustion engine having a rotatable crankshaft, a method of determining a stopping condition of said engine, comprising the steps of:

(A) generating a periodic crankshaft position signal having an amplitude and frequency that vary as a function of the speed and rotational position of said crankshaft;

(B) determining the time interval "T" between each half wave of said position signal;

(C) determining successive peak amplitude values "AMP" of said position signal;

(D) obtaining the ratio of AMP/T for each half wave of said position signal;

(E) obtaining the value "ADHT" according to the formula $$ADHT = AMP_{new}/T_{new}$$

where:

$AMP_{new}$ is the peak amplitude value most recently determined in step (C), and $T_{new}$ is the time interval over which $AMP_{new}$ is determined;

(F) obtaining the value "ADHTR" according to the formula $$ADHTR = ADHT_{new}/ADHT_{old}$$

where:

$ADHT_{new}$ is the value most recently obtained in step (E), and $ADHT_{old}$ is the value previously obtained in step (E);

(G) obtaining the value of the ratio "$ADHTR_{new}/ADHTR_{old}$", where $ADHTR_{new}$ is the value of ADHTR most recently obtained in step (F) and $ADHTR_{old}$ is the value of ADHTR previously obtained in step (F); and (H) comparing the value of the ratio $ADHTR_{new}/ADHTR_{old}$ obtained in step (G) to a preselected constant value related to said stopping condition of said engine, the results of the comparison indicating whether said engine has slowed down and continued in the same rotational direction or stopped and reversed rotational direction.

11. The method as set forth in claim 10, including the steps of:

(I) maintaining a record of the rotational position of said crankshaft; and (J) changing the record of the rotational position maintained in step (I) by a preselected value each time steps (D)–(H) are performed.

12. The method as set forth in claim 10, including the step of detecting a reversal of the rotational direction of said crankshaft using the results of the comparison performed in step (H).

13. The method set forth in claim 10, wherein:

step (A) is performed by sensing the passage of each of a plurality of teeth on a rotating sprocket, wherein at least one of said teeth is missing on said sprocket, the sensing of the passage of said missing tooth introducing an error into certain of the ratios obtained in step (D), and said method further includes the step of compensating for said error by modifying the ratio obtained in step (D) for the half periods in which said error is introduced into said certain ratios.

* * * * *